US007980726B2

(12) United States Patent
Joosen et al.

(10) Patent No.: US 7,980,726 B2
(45) Date of Patent: Jul. 19, 2011

(54) CONTROL DEVICE FOR CONTROLLING THE COLOR OF LIGHT EMITTED FROM A LIGHT SOURCE

(75) Inventors: Bram F. Joosen, Eindhoven (NL); Anthonie H. Bergman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 320 days.

(21) Appl. No.: 12/282,845

(22) PCT Filed: Mar. 2, 2007

(86) PCT No.: PCT/IB2007/050685
§ 371 (c)(1), (2), (4) Date: Sep. 12, 2008

(87) PCT Pub. No.: WO2007/105134
PCT Pub. Date: Sep. 20, 2007

(65) Prior Publication Data

US 2009/0128059 A1 May 21, 2009

(30) Foreign Application Priority Data

Mar. 13, 2006 (EP) .................................... 06111044

(51) Int. Cl.
*F21V 9/16* (2006.01)
*F21V 23/04* (2006.01)
*G01D 11/28* (2006.01)

(52) U.S. Cl. ....... 362/231; 362/23; 362/85; 362/249.05; 362/249.13; 362/295

(58) Field of Classification Search .................. 362/231, 362/230, 23, 29, 85, 235, 246, 249.05, 249.12, 362/249.13, 295, 394
See application file for complete search history.

(56) References Cited

U.S. PATENT DOCUMENTS

| | | | | |
|---|---|---|---|---|
| 6,127,783 | A * | 10/2000 | Pashley et al. | 315/149 |
| 6,149,283 | A * | 11/2000 | Conway et al. | 362/236 |
| 6,552,495 | B1 | 4/2003 | Chang | |
| 6,627,829 | B2 * | 9/2003 | Sato | 200/310 |
| 7,222,979 | B1 * | 5/2007 | Popowich et al. | 362/26 |
| 7,339,128 | B2 * | 3/2008 | Yen | 200/314 |
| 7,405,715 | B2 * | 7/2008 | Guzman et al. | 345/83 |
| 7,598,885 | B2 * | 10/2009 | Kwon et al. | 340/815.45 |
| 2005/0174473 | A1 | 8/2005 | Morgan et al. | |
| 2007/0230159 | A1 * | 10/2007 | Cortenraad et al. | 362/85 |
| 2008/0203943 | A1 * | 8/2008 | Baaijens et al. | 315/291 |

FOREIGN PATENT DOCUMENTS

DE 19942177 3/2001

(Continued)

*Primary Examiner* — Alan Cariaso
(74) *Attorney, Agent, or Firm* — John F. Salazar; Mark L. Beloborodov

(57) ABSTRACT

The invention relates to a control device (1) for controlling the color of light (L) emitted from a light source (2). The control device comprises color variation means (24) for varying the color of said light emitted from said light source and one or more light-emitting elements (26) arranged to indicate an available color variation range for the color of said light emitted from said light source upon operation of said color variation means. The control device 1 further comprises control means (23) capable of controlling at least one color of the light emitted by said light-emitting elements in dependence on said available color variation range for said light emitted by said light source.

5 Claims, 3 Drawing Sheets

FOREIGN PATENT DOCUMENTS

| | | |
|---|---|---|
| EP | 1528785 | 5/2005 |
| WO | 03/015067 | 2/2003 |
| WO | 2004/072840 | 8/2004 |
| WO | 2005/107338 | 11/2005 |
| WO | 2006/048916 | 5/2006 |
| WO | 2006/134529 | 12/2006 |

* cited by examiner

CONTROL DEVICE FOR CONTROLLING THE COLOR OF LIGHT EMITTED FROM A LIGHT SOURCE

FIELD OF THE INVENTION

Generally, the invention relates to light sources. More specifically, the invention relates to a control device for controlling the color of light emitted by a light source, in particular the saturation of the light emitted by said light source.

BACKGROUND OF THE INVENTION

Light sources are widely used in several types of ambience lighting applications for creating a certain atmosphere in e.g. a living room. More and more, these light sources comprise a plurality of light-emitting diodes (LEDs) capable of emitting different colors. Amongst other types of light sources, light sources with LEDs render it possible to control the color of the light emitted by such light sources.

Buttons to switch light sources on and off and dimming control means are familiar to most users of light sources. However, as the possibility of varying the color of the light emitted by a light source is new to many people, there is a need for an easy-to-use and intuitive control device for these light sources.

SUMMARY OF THE INVENTION

It is an object of the invention to provide a control device for controlling the color of light emitted from a light source that is easy to use and intuitive in its operation.

The invention provides a control device for controlling the color of light emitted by a light source. The control device comprises color variation means for varying the color of said light emitted by said light source and one or more light-emitting elements arranged to indicate a color variation range for the color of said light emitted by said light source available through operation of said color variation means. The control device further comprises control means capable of controlling one or more colors of the light emitted by said light-emitting elements in dependence on said available color variation range for said light emitted by said light source.

The light emitting elements dynamically indicate the effect of the operation of the color variation means on the color of the light emitted by the light source in that the control device is provided with light-emitting elements, the color of the emitted light whereof is dependent on the available color variation range for the light emitted by the light source. Consequently, the control device can be operated easily and intuitively.

The embodiment of the invention as defined in claim 2 provides the advantage that saturation of the light emitted by the light source is easily and intuitively controllable. In prior art devices, saturation control is typically indicated by printed symbols that are easily confused with symbols for controlling the hue of the emitted light.

The embodiment of the invention as defined in claim 3 provides the advantage that the hue selection means is capable of displaying the complete range of available hues.

The embodiment of the invention as defined in claim 4 provides the advantage that the available hues can be easily indicated.

The embodiment of the invention as defined in claim 5 provides the advantage that an excellent match is obtained between the color of the light emitted by the light source and the color of the light emitted by the light-emitting elements. Moreover, the light-emitting elements of the control device can be made visible when the control device is operated in the dark. Also, in contrast with a preprinted range of available hues, the colors of the light-emitting element are not corrupted by ambient light conditions.

The embodiment of the invention as defined in claim 6 provides the advantage that light-emitting diodes are available in small sizes and can therefore be implemented in a (portable) control device.

The embodiment of the invention as defined in claim 7 provides the advantage that the number of light-emitting elements can remain limited while the available saturation levels are displayed as a continuous range.

The embodiment of the invention as defined in claim 8 provides the advantage of brightness control for the light emitted by the light source.

It should be appreciated that the subject matter of several of the claims, or aspects thereof, may be combined.

The invention will be further illustrated with reference to the attached drawings, which schematically show preferred embodiments of the invention. It will be understood that the invention is not in any way restricted to these specific and preferred embodiments.

DETAILED DESCRIPTION OF THE DRAWINGS

Figure 1:
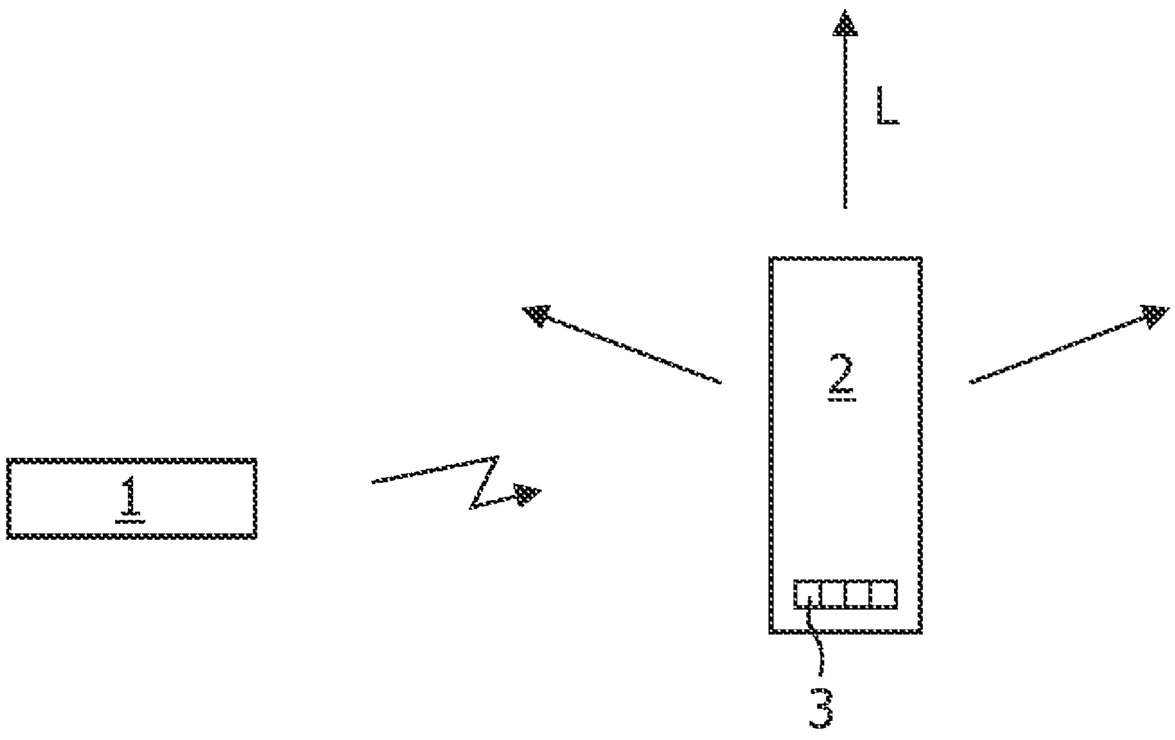
FIG. 1 schematically displays a light source controllable by a control device.

In FIG. 1, is a schematic illustration wherein a control device 1 is used to control a light source 2 comprising a plurality of light-emitting diodes (LEDs) 3 of different colors that allow the light source 2 to emit light L of different colors. Control of the light source 2 by the control device 1 may be performed either in a wireless or a wired (not shown) manner.

In particular, the control device 1 according to an embodiment of the invention is arranged to control the color of the light L of the light source 2. The color of the light L can be defined as the combination of the hue H and saturation S of the light L, as is well known in the art. The hue H of the light L represents the dominant wavelength, while the saturation S of the light L represents the dominance of the hue in the emitted light L; the saturation S being the ratio of the dominant wavelength to all wavelengths that make up the color of the emitted light. A saturation S of 100% for a particular hue H may represent a 'pure' hue H.

Figure 2A:
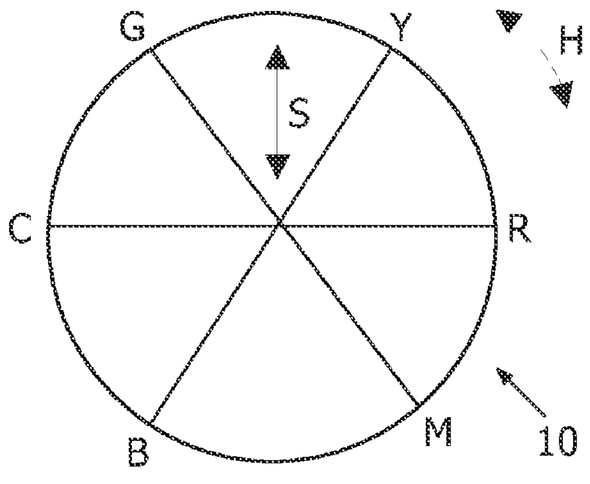
FIGS. 2A and 2B are representations of a color space.

In FIG. 2A, a color wheel 10 is depicted with the saturated colors green (G), yellow (Y), red (R), magenta (M), blue (B), and cyan (C) around the outer perimeter of the wheel 10. It should be appreciated that further (tertiary) saturated colors may be added to provide a full color wheel 10. The hue dimension is defined by the perimeter of the color wheel 10 representing the available hues H. On the other hand, the saturation dimension of the color wheel 10 is defined by the radial direction representing saturations S between 100% (perimeter) and 0% (center of color wheel 10). Clearly, the color wheel 10 provides a plurality of hue/saturation combinations.

Figure 2B:
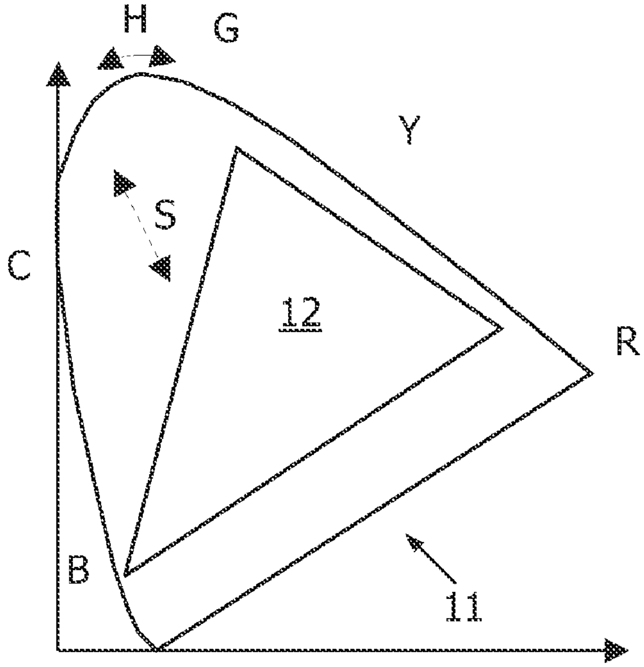

FIG. 2B is a well known representation 11 of the color space, commonly referred to as the CIE representation. The perimeter again represents the hues H, while the inbound direction defines the saturation S. Again, it will be clear that the CIE representation 11 defines a plurality of hue/saturation combinations. Since artificial light from a light source 2 is not capable of covering the entire range of hues H and saturations S, a limited area 12, often referred to as gamut, is drawn in practice to define the practically available hue/saturation combinations. The shape and size of the gamut 12 is determined by the locations of the LEDs 3 in the CIE representation 11.

It should be appreciated that a third characteristic of light L, viz. the brightness, is not represented in either the color wheel 10 or CIE representation 11. The brightness value of light L describes the overall intensity or strength of the light. The control device 1 may be capable of selecting a desired brightness, as will be explained with reference to FIGS. 3A-3D.

FIGS. 3A-3D illustrate a control device 1 and components thereof according to an embodiment of the invention.

Figure 3A:
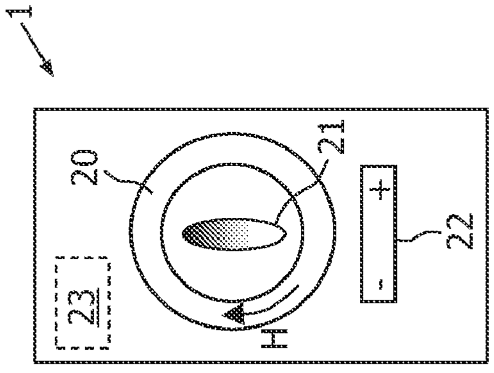
FIGS. 3A-3D illustrate a control device and components thereof according to an embodiment of the invention.

More specifically, the control device 1 displayed in FIG. 3A has a means 20 for selecting the hue H of the light L of the light source 2 and color variation means 21 for varying the color, in particular the saturation S, of the light L of the light source 2. The separate button 22 is provided to manipulate the brightness of the light L of the light source 2. The control device 1 further comprises a control means 23.

Figure 3B:
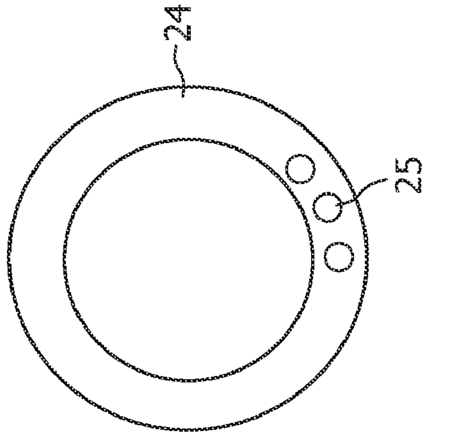

The means 20 for selecting the hue H of the light L comprises a ring-shaped member 24 capable of displaying e.g. 128 hues H available for the light L emitted by the light source 2. The display of the hues H may be achieved, for example, in the form of printed hues H on the ring-shaped member (not shown in detail in FIG. 3A). Alternatively, as is shown in FIG. 3B, the ring-shaped member may include a plurality of further light-emitting elements 25 (only a few are shown) for displaying the range of available hues H for the light L of the light source 2. It is noted that the brightness control button 22 may also be provided in an alternative position, such as within the ring-shaped member 24.

The selection of a hue H for the light L may be detected by any means, including capacitive means which are well known in the art. Such capacitive means are capable of detecting or determining the location of the ring-shaped member 24 that has been touched by the user. It should be noted that other means for detecting the selection of the hue H fall within the scope of the present invention, including visual detection by means of e.g. a camera or by a pressure sensor.

The color variation means 21 in the present embodiment allow variation of the saturation S of the light L of the light source 2. The color variation means 21 include a control button or touch area that can be manually operated by the user to vary the saturation S of the light L. The color variation means 21 further comprises a plurality of light-emitting diodes 26. The light-emitting diodes 26 each have elements for emitting the primary light colors R, G and B such that the diodes are capable of emitting light of colors available for the light L of the light source 2. Such light-emitting diodes 26 are e.g. available from COTCO. Furthermore, the color variation means 21 include a diffuser plate 27 that can be positioned over the light-emitting diodes 26 to suggest that the light emitting elements 26 produce the full available range of saturation S for the light L of the light source 2. This is schematically illustrated in FIG. 3A.

Figure 3C:
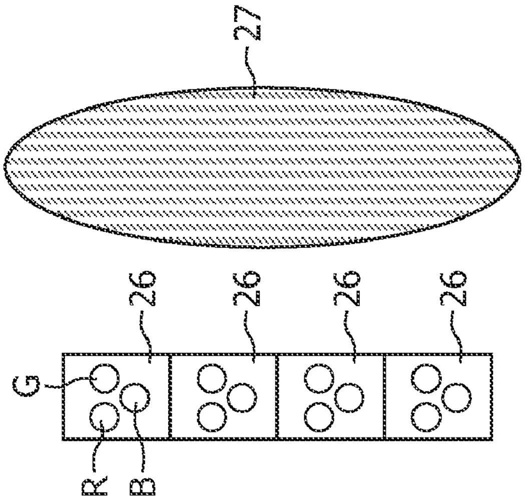
Figure 3D:
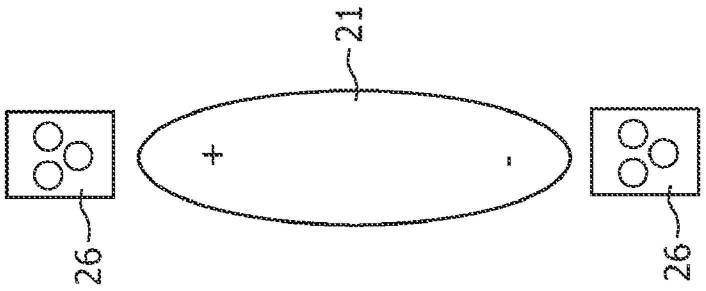

In FIG. 3C, the color variation means 21 has four light-emitting diodes 26. It should be appreciated that more or fewer light-emitting diodes 26 may be used. Preferably, at least two light-emitting diodes 26, as shown in FIG. 3D, are used to indicate the lower and upper limits of the available range of saturations for the light L of the light source 2.

It should further be appreciated that the light-emitting diodes 26 are not necessarily integrated with the color variation means 21. Instead, light-emitting elements 26 may be arranged, for example, near the control variation means, as shown in FIG. 3D.

The control means 23 controls the appearance of the light-emitting elements 26. It may comprise, for example, a look-up table that relates a selected position on the ring-shaped member 24 to a particular hue H for the light L. Furthermore, the look-up table relates this position or the hue H to an available range for the saturation S of the light L. The control means 23 further communicates with the light-emitting elements 26 to control the color of the light emitted by these light-emitting elements 26.

The control device 1 may operate as follows. A user selects a certain position on the ring-shaped member 24 of the means 20 for selecting a hue H. This position is detected and linked to the desired hue H in the control means 23. Furthermore, the control means 23 control the color of the light emitted by the light-emitting diodes 26 in dependence on the selected hue H. In FIGS. 3A and 3B, the lower light-emitting diode 26 is controlled to emit light of the selected hue H t a very unsaturated level, whereas the upper diode 26 is controlled to emit substantially saturated light of the selected hue H. The intermediate diodes 26 are controlled to emit light of a hue H with a saturation S between the saturation S of the lower and upper diodes 26. The hue H and saturation S of the light-emitting diodes 26 are controlled by appropriate signals provided to the R, G and B elements of the light-emitting diodes 26. The diffuser plate 27 provides the suggestion that the four diodes 26 indicate the full available range of saturations S corresponding to the selected hue H.

If the user desires the light source 2 to emit light L of another color, he selects a new hue H by operating the means 20 for selecting a hue H. After selection of the hue H, the control means 23 adapt the light emitted by the light-emitting elements 26 so as to display the available color saturation range related to the new hue H that can be realized by operating the color variation means 21. Consequently, the effect of operating the color variation means 21 is clear to the user, and the control device 1 can be operated easily and intuitively.

The hue H and saturation S for the light L selected on the control device 1 are finally communicated to the light source 2.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

The invention claimed is:

1. A control device for controlling the color of light emitted by a light source, wherein said control device comprises:

a color variation selector to display and select variations of the color of light emitted by a light source including a plurality of light-emitting elements arranged to indicate a color variation range for the color of said light emitted by said light source;

wherein said color variation range is available through operation of said color variation selector;

a controller capable of controlling at least one color of the light emitted by said light-emitting elements in dependence on said available color variation range for said light emitted by said light source;

a hue variation selector to display and select the hue of said light emitted by said light source wherein said controller is further capable of controlling the hue of said light emitted by said light-emitting elements to indicate an available variation range in dependence on said selected hue;

wherein said hue is a continuous ring-shaped display and touch sensor having a plurality of LEDs for displaying the range of hues available for said light by said light source.

2. The control device according to claim 1, wherein said light-emitting elements comprise one or more light-emitting diodes.

3. The control device according to claim 1, further comprising a diffuser plate arranged over said color variation selector.

4. The control device according to claim 1, wherein said control device further comprises a brightness variation selector.

5. A hand held control device for controlling the color of light emitted by a light source comprising:

a vertically oriented color variation display and selector to display a variation of colors available for display by said light source which includes a plurality of light-emitting elements arranged to indicate a color variation range for the color of said light emitted by said light source, wherein said range is available for selection by a user touch selection of said color variation display and selector;

an annular hue variation display and selector to display a variation of hues available for display by said light source which includes a plurality of light emitting elements arranged to indicate a hue variation range for the hue of said light emitted by said light source, wherein said hue variation range is available for selection by a user touch selection of said hue variation display and selector;

a light controller mechanism controlling said light emitting elements of said annular hue variation display and selector and said light emitting elements of said vertically oriented color variation display and selector;

a diffuser plate positioned said light-emitting elements of said color variation and selector diffuse light from said light emitting elements thereby appearing to produce a full range of saturation for said light of said light source.

* * * * *